United States Patent Office 3,810,821
Patented May 14, 1974

3,810,821
ENZYMES ATTACHED TO CELLULOSE CARBONATE
Sidney Alan Barker, John Frederick Kennedy, and Charles John Gray, Birmingham, England, assignors to Ranks Hovis McDougall Limited, London, England
No Drawing. Continuation-in-part of applications Ser. No. 95,414, Dec. 4, 1970, now abandoned, and Ser. No. 98,214, Dec. 14, 1970, now Patent No. 3,705,890. This application Dec. 7, 1972, Ser. No. 312,928
Claims priority, application Great Britain, Dec. 18, 1969, 61,701/69, 61,702/69
Int. Cl. C07g 7/02
U.S. Cl. 195—63                                     12 Claims

ABSTRACT OF THE DISCLOSURE

Cellulose carbonate is prepared by reacting cellulose or a 6-substituted cellulose, e.g. methyl cellulose, hydroxyethyl cellulose, carboxymethyl cellulose and diethylaminoethyl with an alkyl or aryl chloroformate. Water-insoluble enzyme preparations are produced by reacting the enzyme, e.g. mouse kidney extract, $\beta$-glucosidase, trypsin, $\alpha$-amylase, glucoamylase or mouse liver extract, dissolved or suspended in aqueous solution with the cellulose carbonate.

---

This application is a continuation-in-part of application S.N. 95,414 filed Dec. 4, 1970, now abandoned, and a continuation-in-part of application S.N. 98,214, filed Dec. 14, 1970, now U.S. Pat. No. 3,705,890.

The invention is for improvements in or relating to cellulose derivatives and has particular reference to cellulose carbonate.

It is an object of the invention to provide as new chemical compounds cellulose carbonates and methods for their preparation.

A cellulose carbonate prepared as hereinafter described in Examples I to III may be employed inter alia as a solid matrix in chemical coupling with enzymes such as glucosidase and trypsin or mixtures of one or more enzymes as described in our copending application S.N. 95,414, filed Dec. 4, 1970 and hereinafter in order to provide water insolubilized enzyme preparations in a form in which they can be used repeatedly and be more stable to heat than the corresponding soluble enzyme.

The reaction of excess of ethyl chloroformate with pyranoid compounds containing vicinal diequatorial hydroxy groups is known to give trans-five membered cyclic derivatives in the presence of triethylamine. Thus, methyl 4,6-O-benzylidene-$\alpha$-D-glucopyranoside gave the 2,3-carbonate and methyl 2,6-di-O-methanesulphonyl-$\alpha$-D-glucopyranoside gave the 3,4-cyclic ester (Doane, W. M., Shasha, B. S., South, E. I., Russell, C. R. and Rist, C. E., Carbohydrate Res., 4, 445 [1967]). According to reaction conditions methyl 4,6-O-benzylidine-$\alpha$-D-glucopyranoside also gave the 2,3-di-O-ethyloxycarbonyl or the 2- and 3-monoesters. These workers also stated that the 2,3-trans fused cyclic carbonates showed characteristic absorptions in the region of 1825 cm.$^{-1}$ and 1840 and 1810 cm.$^{-1}$ of the infrared spectrum. The O-ethyloxycarbonyl group absorbed at 1750 cm.$^{-1}$. Carbonate derivatives have been made of polysaccharides such as dextran and dextrin, that are soluble in dimethyl sulphoxide (Doane W. M., South, E. I., Shasha, B. S. Russell, C. R. and Rist, C. E. Carbohyd. Res. 5, 366 [1967], 8, 266 [1968]). The cellulose carbonate described herein is so far as we are aware the first insoluble polymer converted to its carbonate derivative. 2,3-trans cyclic carbonates undergo ring opening with methanol, toluenethiol or piperidine to give mixtures of the 2- or 3-substituted derivatives in the presence of triethylamine (South, E. I., Doane, W. M., Shasha, B. S., Russell, C. R. and Rist, C. E. Tetrahedron letters 4481 [1967]).

The invention accordingly provides a cellulose carbonate more particularly a cellulose 2,3-carbonate. The invention further provides derivatives of cellulose including trans cyclic carbonate groupings bridging $C_2$ and $C_3$ of some or all of its 1,4-$\beta$-D-glucopyranose units. The cellulose may also be substituted at $C_6$ in some or all of its 1,4-$\beta$-D-glucopyranose units. Thus the cellulose carbonate may contain not only cyclic carbonate structures derived by reaction of ethyl chloroformate with the trans hydroxyl groups on carbon two and carbon three of some or all of the D-gluco-pyranose residues in the cellulose but also O-ethyloxycarbonyl groups derived by the reaction of ethyl chloroformate with certain of the hydroxyl groups on carbon two, three or six of the D-glucopyranose residues.

According to the present invention there is also provided a process for the preparation of a cellulose carbonate which comprises reacting cellulose or a 6-substituted cellulose with an alkyl or aryl chloroformate in an organic solvent.

The chloroformate is preferably ethyl chloroformate. Methyl chloroformate, phenyl chloroformate and benzyl chloroformate may also be employed.

The reaction may be conveniently carried out at 0° C. for approximately 10 minutes in dimethyl sulphoxide/dioxan. Dimethylformamide/dioxan or other solvent mixture may also be employed.

A base for example a tertiary amine is preferably present.

All components of the reaction are preferably dry.

The ethyl chloroformate and tertiary amine, e.g. triethylamine, may be dissolved in dimethyl sulphoxide or dimethylformamide or other solvent or solvent mixture devoid of —OH, —SH, —NH and —NH$_2$ groups.

The 6-substituted cellulose may be methyl cellulose, hydroxyethyl cellulose, carboxymethyl cellulose or diethylaminoethyl cellulose. Thus the cellulose employed as starting material may be already substituted at $C_6$ in some or all of its 1,4-$\beta$-D-glucopyranose residues.

The cellulose carbonate products of the present invention may also be employed as intermediates in the preparation of 6-substituted cellulose derivatives with modified solubility properties when derivatives may be more resistant to microbial breakdown.

Following is a description by way of example of methods of carrying the invention into effect.

EXAMPLE I

Cellulose (1 g. Sigmacell type 38 purchased from Sigma Chemical Co., England) was suspended in liquid dimethyl sulphoxide (10 ml.), p-dioxan (1.5 ml.) and triethylamine (8 ml.) and stirred at 0° C. for 5 minutes. Ethyl chloroformate (16 ml.) was added dropwise, and stirring continued for 10 minutes.

The mixture was then neutralized to pH 7.0 with 6 N HCl. The mixture was suspended in 90% ethanol (400 ml.) at 20° C. using a Waring blender, filtered, and the cellulose carbonate washed with 90% ethanol (200 ml.), ethanol (200 ml.) diethyl ether (200 ml.) and dried in vacuo over $P_2O_5$ at 20° C.

EXAMPLE II

Example I was scaled up five times except that proportionally more dimethyl sulphoxide (150 ml.) was used to suspend the cellulose and only 400 ml. diethyl ether for washing the cellulose carbonate.

This sample and a cellulose control were analyzed by quantitative infrared spectral analysis. Samples (1–3 mg.) were accurately weighed and mixed with ground dry potassium bromide (300 mg.). After grinding, the homogeneous mixture was pressed at 9.5 tons in a die in an evacuated chamber, and the resultant potassium bromide disc, (13 mm. diameter, 0.8375 mm. thick) placed in the sample beam of a Perkin-Elmer Model 21 double beam infrared spectrophotometer with a scanning range of 4000–650 cm.$^{-1}$. A blank potassium bromide disc was placed in the reference beam, and scanning was carried out in the range 2000–1600 cm.$^{-1}$. The sample showed peaks at 1835, 1810 and 1750 cm.$^{-1}$, and, in terms of a calibration curve constructed from a sample of dextran carbonate containing a known proportion of cyclic carbonate groups assessed by an independent method, the sample contained cyclic carbonate groups on 12.4% of the sugar units (Table I). Subsequent preparations were analyzed by infrared spectroscopy in the same way.

Absorption at 1810 cm.$^{-1}$ has been attributed to cyclic carbonate formation while absorption at 1750 cm.$^{-1}$ has been assigned to ethyloxycarbonyl groups.

EXAMPLE III

Example II was scaled up four times (20 g., cellulose) using only 90% ethanol (1.5 l.), ethanol (2 l.) and diethyl ether (0.5 l.) for washing the cellulose carbonate.

EXAMPLE IV

Three lots of cellulose (1 g.) were each suspended in liquid dimethyl sulphoxide (30 ml.), p-dioxan (2 ml.) and triethylamine (8 ml.) and the mixtures stirred at 0° C. for 5 minutes. Methyl chloroformate (13 ml.), ethyl chloroformate (16 ml.) or phenyl chloroformate (21 ml.) was added dropwise to each, and the mixtures left for 10 minutes and then neutralized to pH 7.0 with 6 N hydrochloric acid. The three products were recovered as described in Example I, and examined for infrared absorption at 1835, 1810 and 1750 cm.$^{-1}$.

| Product from— | Infrared absorption at— | | |
|---|---|---|---|
| | 1,835 cm.$^{-1}$ | 1,810 cm.$^{-1}$ | 1,750 cm.$^{-1}$ |
| Methyl chloroformate, 0.95 g. | Absent | Absent | Present. |
| Ethyl chloroformate, 0.80 g. | Present | Present | Do. |
| Phenyl chloroformate, 0.96 g. | do | do | Do. |

Repetition of the above procedures omitting dimethyl sulphoxide entirely and using p-dioxan (30 ml.) gave products whose infrared spectra showed little or no absorption at 1835, 1810 or 1750 cm.$^{-1}$, whether derived from methyl, ethyl or phenyl chloroformate. A similar experiment with benzyl chloroformate (24 ml.) gave a similar result.

EXAMPLE V

Cellulose (0.2 g., type as used in Example I), dried in vacuo over phosphorus pentoxide at 20° C. for 24 hours, was suspended in dimethyl sulphoxide which had been dried with calcium hydride and distilled under reduced pressure, B.P. 37° C. at 0.5 mm. Hg, (2.0 ml.). p-Dioxan, dried by refluxing for 12 hours with molten sodium and distilled, (0.3 ml.), and triethylamine, dried by treating with potassium hydroxide pellets for 24 hours and distilled, (1.6 ml.) were added and the mixture stirred at 0° C. in an ice bath for 5 minutes. Ethyl chloroformate (3.2 ml.) was added dropwise over 12 minutes, and the mixture left to react with stirring for 10 minutes. The mixture was then neutralized to pH 7.0 by the addition of 6.0 N hydrochloric acid. The mixture was washed by stirring and centrifuging with ethanol (9× 15 ml.), diethyl ether (3× 15 ml.) at 20° C., and then dried in vacuo over phosphorus pentoxide at 20° C.

EXAMPLE VI

Cellulose (4× 0.2 g.) was suspended in dry dimethyl sulphoxide, dry p-dioxan and dry triethylamine, and was treated with ethyl chloroformate exactly as described in Example V but using reaction times of 10, 30, 60 and 240 minutes. After these times, the reaction mixtures were immediately washed by stirring and centrifuging with p-dioxan, which had been dried as in Example V (10× 15 ml.). The first stirring and centrifuging were standardised to effect termination of the reaction within 1 minute. After these washings, the supernatant p-dioxan diluted 1:1 with water showed a pH of 7.5. Washing was continued with ethanol which had been dried over calcium oxide for 24 hours and distilled (3× 15 ml.), and then continued with diethyl ether, which had been dried over sodium wire (3× 15 ml.), at 20° C. and the products dried and stored as in Example V.

EXAMPLE VII

Cellulose (5× 0.2 g.) was reacted with ethyl chloroformate exactly as described in Example VI, using only the 10 minute reaction time but varying the amount of dimethyl sulphoxide (2.0, 1.5, 1.0, 0.5 and 0.0 ml.). In each case where less than the standard amount (2.0 ml.) of dimethyl sulphoxide was used, extra p-dioxan (0.5, 1.0, 1.5 and 2.0 ml., respectively) was used to maintain the concentration of the other reagents. After the reaction, washing and storage were effected as described in Example VI.

EXAMPLE VIII

Cellulose (4× 0.2 g.) was reacted with ethyl chloroformate as described in Example VI, using only the 10-minute reaction time but varying the amount of triethylamine (1.6, 0.8, 0.4 and 0.0 ml.). In each case where less than the standard amount (1.6 ml.) of triethylamine was used, extra p-dioxan (0.8, 1.2 and 1.6 ml., respectively) was used to maintain the concentration of the other reagents. After the reaction, washing and storage were effected as described in Example VI.

EXAMPLE IX

Cellulose (0.2 g.) was suspended as described in Example VI, but using, in place of dimethyl sulphoxide, dimethylformamide which had been dried over potassium hydroxide then calcium oxide and distilled (2.0 ml.). The reaction with ethyl chloroformate was allowed to proceed for 10 minutes. Washing and storage were effected as described in Example VI.

EXAMPLE X

Cellulose (0.2 g.) was treated exactly as described in Example IX. A second lot (0.2 g.) was similarly treated but using less dimethylformamide (1.0 ml.) and additional p-dioxan (1.3 ml. total).

EXAMPLE XI

Cellulose (0.2 g.) was treated exactly as described in Example IX. A second lot (0.2 g.) was similarly treated but omitting the use of p-dioxan and using additional dimethylformamide (4.0 ml. total).

EXAMPLE XII

Cellulose (0.2 g.) was treated exactly as described in Example IX. A second lot (0.2 g.) was similarly treated, but omitting the use of triethylamine and replacing it with additional dry p-dioxan (1.9 ml. total).

EXAMPLE XIII

Cellulose (0.2 g.) was treated as described in the second experiment in Example XI. A second lot of cellulose (0.2 g.) was similarly treated, but the ethyl chloroformate was added dropwise over 3 minutes instead of over 12 minutes. A reaction time of 10 minutes was used.

EXAMPLE XIV

Dry solvents, dry washing, other chloroformates in place of ethyl chloroformate. Cellulose (3× 0.2 g.) was treated as described in Example VI but using equivalent molar quantities of methyl, phenyl and benzyl chloroformates (3.2 ml., 4.5 ml. and 5.0 ml. respectively) in place of ethyl chloroformate. Washing and storage were effected as in Example VI.

EXAMPLE XV

Diethylaminoethyl cellulose (Type DE 32, Whatman, 0.2 g.) was reacted with ethyl chloroformate as described in Example VI using the 10-minute reaction time. After the reaction, washing and storage were effected as described in Example VI.

The ring opening reactions of ammonia and benzylamine to give urethane links further demonstrate the initial presence of the trans 2,3 cyclic carbonate.

This invention is also for improvements in or relating to enzymes and has particular reference to the modification of enzymes by attachment to solid matrices.

More particularly, this invention relates to the water insolubilization of enzymes by chemically attaching them to a cellulose derivative and has as an object the provision

TABLE I. QUANTITATIVE INFRARED SPECTROSCOPY OF CELLULOSE CARBONATES

| Example | Description of preparation [a] | Optical density per mg. at the maxima of the peaks occurring at the following frequencies— | | | | Relative height of cyclic carbonate (1,810 cm.$^{-1}$ peak) with respect to that in Example II (1,810 cm.$^{-1}$ peak) | Absorbancy at 1,750 cm.$^{-1}$ (due to ethyloxy carbonyl) relative to absorbancy at 1,810 cm.$^{-1}$ (cyclic carbonate) |
|---|---|---|---|---|---|---|---|
| | | 1,835 cm.$^{-1}$ | 1,810 cm.$^{-1}$ | 1,75 cm.$^{-1}$ | 1,675 cm.$^{-1}$ | | |
| II | Wet solvents, larger scale, neutralized before wet washing. | 0.0501 | 0.0944 | 0.0679 | 0.0000 | 1.00 | 0.72 |
| V | Dry solvents, neutralized before wet washing | 0.1551 | 0.1833 | 0.1766 | 0.0000 | 1.95 | 0.96 |
| VI | Dry solvents, dry washing— | | | | | | |
| | 10 minutes reaction time | 0.3409 | 0.4122 | 0.1476 | 0.0685 | 4.37 | 0.36 |
| | 30 minutes reaction time | 0.1525 | 0.2139 | 0.1698 | 0.0000 | 2.26 | 1.79 |
| | 60 minutes reatcion time | 0.0912 | 0.1192 | 0.1188 | 0.0000 | 1.35 | 0.93 |
| | 240 minutes reaction time | 0.0848 | 0.1150 | 0.1015 | 0.0000 | 1.21 | 0.89 |
| VII | Dry solvents, dry washing— | | | | | | |
| | 0.75 standard amount DMSO | 0.2041 | 0.2009 | 0.2255 | 0.0130 | 2.13 | 1.12 |
| | 0.50 standard amount DMSO | 0.1380 | 0.1686 | 0.1065 | 0.0181 | 1.78 | 0.63 |
| | 0.25 standard amount DMSO | 0.0600 | 0.0646 | 0.0286 | 0.0177 | 0.68 | 0.44 |
| | 0.00 standard amount DMSO | 0.0322 | 0.0404 | 0.0107 | 0.0158 | 0.43 | 0.26 |
| VIII | Dry solvents, dry washing— | | | | | | |
| | 1.00 standard amount TEA | 0.3630 | 0.3969 | 0.2055 | 0.0636 | 4.20 | 0.52 |
| | 0.50 standard amount TEA | 0.0660 | 0.1288 | 0.0999 | 0.0132 | 1.39 | 0.78 |
| | 0.25 standard amount TEA | 0.0014 | 0.0039 | 0.0015 | 0.0106 | 0.04 | 0.38 |
| | 0.00 standard amount TEA | 0.0000 | 0.0018 | 0.0026 | 0.0108 | 0.02 | 1.48 |
| IX | Dry solvents, dry washing— | | | | | | |
| | DMF (2 ml.) in place of DMSO | 0.1296 | 0.1509 | 0.0300 | 0.0313 | 1.60 | 0.20 |
| X | Dry solvents, dry washing— | | | | | | |
| | DMF (2 ml.) in place of DMSO | 0.1106 | 0.1400 | 0.0316 | 0.0439 | 1.48 | 0.23 |
| | DMF (1 ml.) plus PD (1 ml.) in place of DMSO | 0.0868 | 0.1057 | 0.0349 | 0.0288 | 1.12 | 0.33 |
| XI | Dry solvents, dry washing— | | | | | | |
| | DMF (2 ml.) in place of DMSO | 0.1525 | 0.1577 | 0.0444 | 0.0447 | 1.67 | 0.28 |
| | DMF (4 ml.) in place of DMSO and PD | 0.1371 | 0.1788 | 0.0394 | 0.0476 | 1.89 | 0.22 |
| XII | Dry solvents, dry washing— | | | | | | |
| | DMF (2 ml.) in place of DMSO | 0.1525 | 0.1577 | 0.0444 | 0.0447 | 1.67 | 0.28 |
| | DMF (2 ml.) in place of DMSO, PD (1.6 ml.) in place of TEA. | 0.0027 | 0.0115 | 0.0000 | 0.0240 | 0.12 | 0.00 |
| XIII | Dry solvents, dry washing— | | | | | | |
| | DMF (4 ml.) in place of DMSO and PD [b] | 0.1371 | 0.1788 | 0.0394 | 0.0476 | 1.89 | 0.22 |
| | do. [c] | 0.1013 | 0.1332 | 0.0313 | 0.0232 | 1.41 | 0.24 |
| XIV | Dry solvents, dry washing— | | | | | | |
| | BCF (5.0 ml.) in place of ECF | 0.1021 | 0.0276 | 0.0082 | 0.0000 | 0.29 | 0.30 |
| | MCF (3.2 ml.) in place of ECF | 0.0530 | 0.0852 | 0.0537 | 0.0049 | 0.90 | 0.63 |
| | PCF (4.5 ml) in place of ECF | 0.0092 | 0.0157 | 0.0318 | 0.0000 | 0.17 | 2.03 |
| | Cellulose control | 0.0000 | 0.0000 | 0.0000 | 0.0000 | | |
| XV | Diethylamioethyl cellulose. Dry solvents, dry washing, 10 minutes reaction time. | 0.0440 | 0.0573 | 0.0000 | 0.0268 | 0.61 | 0.00 |

[a] Standard conditions (0.2 g. dry cellulose, 2.0 ml. dry DMSO, 0.3 ml. dry PD, 1.6 ml. dry TEA, 3.2 ml. ethyl chloroformate added over 12 minutes, reaction time 10 minutes, washed with 10×5 ml. dry PD and then 3× 15 ml. dry ethanol) are assumed unless specified otherwise.
[b] ECF added over 12 minutes.
[c] ECF added over 3 minutes.

NOTE.—Abbreviations: BCF, benzyl chloroformate; DMF, dimethyl formamide; DMSO, dimethyl sulphoxide; ECF, ethyl chloroformate; MCF, methyl chloroformate; PCF, phenyl chloroformate; PD, p-dioxan; TEA, triethylamine.

Reaction of cellulose carbonate with ammonia and benzylamine

Cellulose carbonate (prepared as in Example VI, 10 minute reaction time (0.2 g.), was mixed and stirred with 0.36 N ammonium hydroxide (5 ml.) at 20° C. for 3 hours. After centrifugation, aliquots of the supernatant were titrated with 0.1 N hydrochloric acid. The centrifuged product was washed and dried as in Example VI and i.r. analysis carried out as usual. Elemental analysis of the coupled product yielded C=41.6%, H=5.7% and N=0.8%. The nitrogen content corresponds to a minimum cyclic carbonate content of 11.7% compared with 16.7% based on titration. The total cyclic carbonate available for reaction, based or i.r. analysis together with the appropriate calibration curve with dextran carbonate was 37.6%. A similar coupling was carried out with benzylamine, and the percentage cyclic carbonate based on titration was 11.4% compared with 14.7% based on nitrogen content.

of enzyme preparations in a form in which they can be used repeatedly and be more stable to heat and other inactivation conditions than the corresponding soluble enzyme. This process of water insolubilization of enzymes can also be used to concentrate the enzymes produced in a fermentation medium, a cellular extract, biological fluid or other aqueous fluids containing these enzymes either alone or in admixture with other compounds. Further, more than one particular enzyme may be attached simultaneously to the cellulose derivative (i.e. a cellulose carbonate) in the insolubilization.

Hydrophilic carriers are favored for enzyme insolubilization since they are more effective in enzyme binding and the resulting derivatives tend to be more stable. Thus, ribonuclease and chymotrypsin have been coupled to both diazotised p-aminobenzyl cellulose (Mitz, M.A. and Summaria, L. J., Nature, 189, 576 [1961]) and to diazotised p-aminobenzoyl cellulose (Lilly, M., Money, C., Hornby, W. and Crook, E. M., Biochem. J., 95, 45p [1965]). Recently, creatine phosphotransferase has been coupled to diazotised p-aminobenzoyl cellulose (Hornby, W. E., Lilly, M. D. and Crook, E. M., Biochem. J., 107, 669 [1968]) and aminoacylase to diazotised p-aminobenzyl cellulose (Tosa, T., Mori, T., Fuse, N, and Chigata, I., Enzymologia, 31, 214 [1966]) Mitz and Summaria (1961 loc. cit.) also used carboxymethyl cellulose azide to prepare water insoluble derivatives of trypsin, chymotrypsin and ribonuclease. Many other carboxymethyl cellulose based preparations have been reported: trypsin and ribonuclease (Epstein, C. J. and Anfinsen, C. B., J. Biol. Chem., 237, 2175 [1962]), trypsin and chymotrypsin (Takami, T. and Ando, T., Seikagaku 40, 749 [1968]), chymotrypsin, ribonuclease and ficin (Lilly, M., Money, C., Hornby, W. and Crook, E. M., Biochem. J., 95, 45p [1965]) and many others.

It is also an object of the present invention to provide active water insoluble enzyme preparations wherein the enzyme is chemically coupled with a cellulose carbonate.

Specifically, the present invention provides water insoluble mouse kidney extract, $\beta$-glucosidase, trypsin, $\alpha$-amylase, glucoamylase and mouse liver extracts chemically coupled to a cellulose carbonate.

According to the present invention, there is also provided a process for the preparation of a water insoluble enzyme preparation which comprises reacting the enzyme dissolved or suspended in an aqueous solution with a cellulose carbonate or a diazotized diaminobenzene derivative thereof.

Cellulose carbonate and a method for its preparation is described in our copending application S.N. 98,214, filed Dec. 14, 1970, and above.

A diazotized diaminobenzene derivative of cellulose carbonate and a method for its preparation are described in Example XXVII hereafter.

The aqueous solut ion preferably contains a suitable buffer such as phosphate or borate in the pH range 2.7 to 11.8 (optimum between 6.5 and 8.5). The temperature may be between 0° C. and 50° C., but preferably below 4° C. and the reaction time may be between 2 minutes and 3 hours. Although not always desirable for maximum retention of enzymic or other biological activity, triethylamine or other tertiary organic bases may replace the inorganic buffers or be added to them in this stage of the proces if required. When the enzymic or biological activity is exhausted the enzyme or other entity containing protein can be removed by selective acid, base or enzymic hydrolysis and the cellulose matrix reused to produce cellulose carbonate. In this sense, it constitutes a regeneratable system of insolubilized enzyme production.

Preparation of cellulose carbonate

Preparation I

Cellulose (1 g., Sigmacell type 38 purchased from Sigma Chemical Co. England) was suspended in liquid dimethyl sulphoxide (10 ml.), p-dioxan (1.5 ml.) and triethylamine (8 ml.) and stirred at 0° C. for 5 minutes. Ethyl chloroformate (16 ml.) was added dropwise, and stirring continued for 10 minutes. The mixture was then neutralised to pH 7.0 with 6 N HCl. The mixture was suspended in 90% ethanol (400 ml.) at 20° C. using a Waring blender, filtered and the cellulose carbonate washed with 90% ethanol (200 ml.), ethanol (200 ml.), diethyl ether (200 ml.) and dried in vacuo over $P_2O_5$ at 20° C.

Preparation II

Preparation I was scaled up five times except that proportionally more dimethyl sulphoxide (150 ml.) was used to suspend the cellulose and only 400 ml. diethyl ether used for washing the cellulose carbonate.

Preparation III

Preparation II was scaled up four times (20 g. cellulose) using only 90% ethanol (1.5 l.), ethanol (2 l.) and diethyl ether (0.5 l.) for washing the cellulose carbonate.

Following is a description by way of example of methods of carrying the invention into effect.

EXAMPLE XVI

Coupling of cellulose carbonate with mouse kidney extract

Washed mouse kidneys (4 g.) were macerated in a top-drive macerator with 0.1 M citrate buffer pH 4.5 (50 ml.) for 5 minutes. The resulting mixture was then centrifuged at 8,700 g. for 20 minutes and the supernatant taken.

Cellulose carbonate (Preparation I, 200 mg.) was suspended in water (10 ml.) at 4° C., and mouse kidney extract (5 ml.) in 0.05 citrate buffer pH 4.4 added followed by triethylamine (0.2 ml.). After stirring for several hours both this and a control in which cellulose replaced cellulose carbonate were centrifuged. The solids were washed with 0.05 M citrate buffer pH 4.4 (5 ml.) and then M sodium chloride in the same buffer in five alternate sequences followed by three washings with buffer. The final contrifuged products (MKE 1 and control 1) were suspended in 10 ml. 0.05 M citrate buffer pH 4.4. The enzyme activity was assayed by incubating 1 ml. MKE suspension or control 1 with 1 ml. p-nitrophenyl-2-acetamido-2-deoxy-$\beta$-D-glucopyranoside (10 mg. in 5 ml. citrate buffer) at 40° C. Reaction was terminated by addition of an equal volume of 0.2 M sodium carbonate, and the O.D. of the centrifuged supernatant read at 420 m$\mu$ (M.K.E. 1, 0.206; cellulose control 1, 0.086; substrate control, 0.053). Thus, the enzyme $\beta$-N-acetylglucosaminidase is shown to have been bound to the cellulose.

EXAMPLE XVII

Coupling of cellulose carbonate with almond $\beta$-glucosidase

Cellulose carbonate, Preparation I (200 mg.) was suspended in water (10 ml.), and $\beta$-glucosidase (10 mg.) in water (5 ml.) added followed by triethylamine (0.2 ml.). After stirring for 3 hours at 4° C., the solid was filtered off, washed with a solution containing both M sodium chloride and M sucrose and then a solution of 0.005 M acetate buffer pH 4.95 five times alternately, followed by the acetate buffer twice before being suspended in 0.005 M acetate buffer pH 4.95 (10 ml.). The product (B.G. 1), and cellulose control 2 carried through the same procedure, were separately assayed by incubating 1 ml. suspension with 1 ml. o-nitrophenyl-$\beta$-D-glucopyranoside (0.1076 g. in 10 ml. acetate buffer) at 37° C. The reaction was terminated as in Example XVI after 3.5 hours and the O.D. of each centrifuged supernatant read at 420 m$\mu$ (B.G. 1, 2.235; cellulose control 2, 0.417; substrate control, 0.130).

In a repeat experiment but effecting the coupling with $\beta$-glucosidase at 0° C. and maintaining a 20 minute stirring period for each washing also at 0° C. the second batch B.G. 2 when assayed showed O.D. 420 m$\mu$ 0.761; cellulose control 3, 0.117; substrate control, 0.024; after a 1-hour incubation at 36° C. instead of 3.5 hours as previously.

EXAMPLE XVIII

Coupling of cellulose carbonate with trypsin

Cellulose carbonate, Preparation II in 200 mg. aliquots, was suspended in water (10 ml.), and coupled with trypsin (0.0261 g.) in 10 ml. water (a) without addition of triethylamine (b) with addition of 20 $\mu$l. triethylamine and (c) with addition of 200 $\mu$l. triethylamine. A control experiment was performed in which the conditions of (b) were used except for the replacement of cellulose carbonate by cellulose (200 mg.). After stirring at 4° C. for 3 hours, the normal procedure of washing was followed as in Example XVII but using 0.05 M phosphate pH 8.0 instead of acetate. Each product was finally suspended in 0.5 M phosphate buffer pH 8.0 (10 ml.) and an aliquot (0.5 ml.) assayed by using N-$\alpha$-benzoyl-L-arginine ethyl ester hydrochloride as substrate (0.5 ml.; 0.0795 g. in in phosphate buffer) and incubating at 37° C. for 30 minutes. The O.D. 253 nm. was read on the sixteen times diluted samples after cooling in ice water for 10 minutes and centrifuging. After deduction of a substrate control, the O.D. 253 nm. values were (a) 0.215 (b) 0.197 (c) 0.792 compared with a cellulose control of 0.026.

EXAMPLE XIX

Optimum pH for coupling $\beta$-glucosidase to cellulose carbonate in the presence of organic acids or bases Varying amounts of base (triethylamine) or acid (glacial acetic acid) were added to constant volumes (10 ml.) of $\beta$-glucosidase (1 mg.) in aqueous solution. The pH of each was recorded before and after the addition of cellulose carbonate, Preparation III (200 mg.), to each solution at 4° C. using the otherwise normal procedure (see Example XVII) for coupling the enzyme to cellulose carbonate and subsequent washing procedure using 0.005 M acetate buffer pH 4.95. Enzyme activity was assayed as in Example XVII.

| | Glacial acetic acid, μl. | pH Before | pH After | Resultant enzyme activity, O.D. 420 nm. |
|---|---|---|---|---|
| Triethylamine, μl.: | | | | |
| 100 | 0 | 11.80 | 10.85 | 0.220 |
| 50 | 0 | 11.60 | 10.40 | 0.250 |
| 25 | 0 | 11.35 | 10.10 | 0.272 |
| 5 | 0 | 11.00 | 9.00 | 0.432 |
| 2.5 | 0 | 10.75 | 8.50 | 0.795 |
| 1 | 0 | 10.45 | 7.40 | 0.924 |
| 0 | 0 | 5.90 | 6.30 | 0.492 |
| 0 | 1 | 3.75 | 4.00 | 0.192 |
| 0 | 2.5 | 3.60 | 3.70 | 0.192 |
| 0 | 5 | 3.40 | 3.40 | 0.175 |
| 0 | 50 | 2.85 | 2.90 | 0.151 |
| 0 | 100 | 2.70 | 2.70 | 0.124 |

The corresponding substrate blank had O.D. 420 nm. 0.008.

EXAMPLE XX

Optimum pH for coupling $\beta$-glucosidase to cellulose carbonate in the absence of triethylamine Aliquots 200 mg. of cellulose carbonate (preparation III) were suspended severally in 5 ml. 0.1 M phosphate buffer pH 6.1, 0.1 M phosphate buffer pH 7.05, 0.1 M phosphate buffer pH 8.1, 0.1 M borate buffer pH 9.0 and 0.1 M borate buffer pH 9.9. $\beta$-Glucosidase (1 mg. in 5 ml. water) was added to each and coupling effected as in Example XVII carrying out the washing procedure with 0.005 M acetate buffer pH 4.95. Control aliquots (200 mg.) of microcrystalline cellulose were carried through identical procedures for each pH. Enzyme activity was assayed as in Example XVII.

| | pH of buffer in coupling | | | | |
|---|---|---|---|---|---|
| Enzyme activity—O.D. 420 nm. | 6.10 | 7.05 | 8.10 | 9.00 | 9.90 |
| On cellulose carbonate | 0.712 | 1.132 | 1.323 | 0.628 | 0.387 |
| On cellulose | 0.141 | 0.160 | 0.164 | 0.106 | 0.106 |

The corresponding substrate blank had O.D. 420 nm. 0.013.

EXAMPLE XXI

Heat stability of insolubilized $\beta$-glucosidase

Aliquots (0.5 ml.) of cellulose carbonate insolubilized $\beta$-glucosidase (Example XX, pH 8.1) and soluble $\beta$-glucosidase of the same order of activity were incubated at 37° C. and assayed at various times for retention of activity as in Example II; both soluble and insolubilized enzyme were in 0.005 M acetate buffer pH 4.95, but the incubation time for enzyme assay with respect to o-nitrophenyl $\beta$-D-glucopyranoside as substrate was 15 minutes throughout. Substrate controls were incubated simultaneously and individual assays have been corrected.

| | Time | | | | | | |
|---|---|---|---|---|---|---|---|
| | 0 hr. | 7 hr. | 1 day | 2 days | 3 days | 4 days | 6 days |
| Percent activity retention: | | | | | | | |
| Insoluble enzyme | 100 | 93 | 87 | 74 | 47 | 38 | 33 |
| Soluble enzyme | 100 | 17 | 11 | 5 | 3 | 1 | <1 |

EXAMPLE XXII pH stability of insolubilized $\beta$-glucosidase

Aliquots (1 ml.) of cellulose carbonate insolubilized $\beta$-glucosidase (Example XX, pH 7.05) were centrifuged, resuspended in buffer (2 ml.) of differing pH and incubated for 1 day at 37° C. before being again centrifuged, washed with acetate buffer pH 5.0, recentrifuged and resuspended in 0.005 M acetate buffer pH 4.95 (1 ml.). Each aliquot was assayed as in Example XXI.

| pH: | O.D. 420 nm. |
|---|---|
| 2.2 | 0.018 |
| 3.5 | 0.045 |
| 5.0 | 0.209 |
| 8.0 | 0.095 |
| 10.0 | 0.105 | untreated cellulose carbonate insolubilized $\beta$-glucosidase gave O.D. 420 nm. 0.428.

EXAMPLE XXIII pH-activity relationships of free and bound (cellulose carbonate) $\beta$-glucosidase with o-nitrophenyl-$\beta$-D-glucopyranoside as substrate The bound enzyme used in this experiment was a mixed lot obtained from couplings at three pH values (6.10, 7.05 and 9.00 as in Example XX). The free and bound enzymes were examined for activity at a series of pH values using the following methods:

(a) Free enzyme.—The enzyme and substrate (final concentrations, 1 μg./ml. and 1 mg./ml., respectively) were incubated the appropriate buffered solutions (see below) for 30 minutes at 37° C. The reaction mixture was then added to an equal volume of 0.2 M sodium carbonate solution and the optical density at 420 nm. read.

(b) Bound enzyme.—The cellulose carbonate-enzyme (20 mg. suspended per ml.) was stirred in the presence of the substrate (final concentration, 1 mg./ml.) in the appropriate buffered solutions (see below) for 30 minutes at 37° C. and assayed at various times for retention was added to an equal volume of 0.2 M sodium carbonate and the optical density read at 420 nm.

The results are shown in Table II.

TABLE II

Activity of free and bound (cellulose carbonate) $\beta$-glucosidase against o-nitrophenyl-$\beta$-D-glucopyranoside

| | | O.D. at 420 nm. | |
|---|---|---|---|
| pH | Buffer (final concentration) | Free enzyme | Bound enzyme |
| 3.0 | Citric acid sodium citrate (0.05 M) | 0.024 | 0.119 |
| 4.0 | do | 0.198 | 0.322 |
| 5.0 | do | 0.441 | 0.540 |
| 6.0 | do | 0.429 | 0.388 |
| 7.0 | Phosphate (0.05 M) | 0.202 | 0.217 |
| 8.0 | do | 0.110 | 0.108 |
| 9.0 | Boric acid-borax (0.05 M) | 0.070 | 0.098 |
| 10.0 | Borax-sodium hydroxide (0.05 M) | 0.024 | 0.062 |

EXAMPLE XXIV

Coupling of mouse liver extract enzymes to cellulose carbonate

Mouse liver extract was prepared using the method for mouse kidney extract described in Example XVI.

Cellulose carbonate (200 mg.) in water (10 ml.) was stirred with mouse liver extract (10 ml.) in 0.05 M citrate pH 4.4 and 0.2 ml. triethylamine added. After leaving overnight the product was washed with six alternate sequences of 0.05 M citrate buffer pH 4.4 and 1 M sodium chloride. A control experiment in which cellulose was substituted for cellulose carbonate was also carried out. The insolubilized enzyme activities were determined on 1 ml. aliquots of the suspensions of both final products in 10 ml. 0.05 M citrate buffer pH 4.4 by incubating with the substrates (1 ml., 25 mg. in 10 ml. buffer) shown in Table III alongside substrate controls and reading at 420 nm. The effect upon the substrates listed at the top of Table II show there has been reacted mouse liver $\beta$-galactosidase, $\alpha$-mannosidase, $\alpha$-glucosidase, and $\beta$-N-acetylglucosaminidase.

TABLE III.—ENZYMATIC ACTIVITY OF INSOLUBILIZED MOUSE LIVER EXTRACT ENZYMES

| | Substrate | | | |
|---|---|---|---|---|
| | o-Nitrophenyl $\beta$-D-galacto-pyranoside | p-Nitrophenyl $\alpha$-D-manno-pyranoside | p-Nitrophenyl $\alpha$-D-gluco-pyranoside | p-Nitrophenyl 2-acetamido 2-deoxy $\beta$-D-glucopyranoside |
| Incubation time | 2.5 hr. at 37° C. | 2.5 hr. at 40° C. | 2.5 hr. at 37° C. | 2.5 hr. at 37° C. |
| Cellulose carbonate—mouse liver extract condensate | 0.109 | 0.135 | 0.321 | 0.370 |
| Cellulose—mouse liver extract control | 0.030 | Zero | Zero | 0.032 |

EXAMPLE XXV

Optimum pH for coupling $\alpha$-amylase to cellulose carbonate in the absence of triethylamine $\alpha$-Amylase was applied using the procedure of Example XX at concentration 20 mg. per 100 mg. cellulose carbonate (Preparation I) using aqueous buffers without triethylamine pH 4.5–10.0 with 3 hours coupling at 4° C. in appropriate buffers.

| pH | Bound protein, mg./g. solid | Enzyme units per mg. protein | Percent retention |
|---|---|---|---|
| 4.5 | 3.5 | 4.8 | 30.0 |
| 6.9 | 3.9 | 8.7 | 54.2 |
| 7.6 | 4.1 | 8.35 | 52.0 |
| 8.0 | 4.4 | 4.9 | 30.6 |
| 9.0 | 5.4 | 3.2 | 20.0 |
| 10.0 | 4.8 | 2.6 | 16.2 |

1 unit of $\alpha$-amylase is that which liberates reducing sugar equivalent to 1 mg. maltose in 3 minutes at 20° C. Activity of free enzyme in solution=16 units/mg. protein.

$\alpha$-Amylase was also applied at concentration 20 mg. per 100 mg. cellulose carbonate (Preparation II) at pH 7.6 for coupling times 0.5, 1, 3 and 24 hours.

| Coupling time | Bound protein | Enzyme units | Percent retention |
|---|---|---|---|
| 0.5 | 4.1 | 5.11 | 32.0 |
| 1 | 3.7 | 6.1 | 40.6 |
| 3 | 6.1 | 4.7 | 29.3 |
| 24 | 5.9 | 4.6 | 28.8 |

EXAMPLE XXVI

Coupling of glucoamylase to cellulose carbonate

Cellulose carbonate (100 mg.) was stirred with a solution of glucoamylase (ex. *Aspergillus niger*, 27 units per mg. protein, 3.6 mg. protein per ml. in 0.1 M phosphate buffer pH 7.8; 1.0 ml.) at 4° C. for 3 hours. The solid was filtered off, washed as described in Example XVII and finally suspended in 0.2 M acetate buffer pH 4.0 (5 ml.). A control reaction was carried out in the same way using 1.0 ml. of glucoamylase solution and 100 mg. cellulose.

Assay for glucoamylase activity

Starch solution (1% in 0.2 M acetate buffer pH 4.0; 4.5 ml.) was incubated, with stirring with the suspension of the solid phase enzyme (0.5 ml.) for 1 hour at 45° C. The assay mixture was then cooled and centrifuged and 0.1 ml. of the supernatant taken for glucose determination in the glucose oxidase assay for which a standard reference curve was established. The solid phase enzyme preparation caused release of 35 $\mu$g. of glucose while the control preparation caused release of 17 $\mu$g.

EXAMPLE XXVII

Coupling of $\beta$-glucosidase with a diazotized diaminobenzene derivative of cellulose carbonate Diazotized diaminobenzene derivative.—m - Diaminobenzene (distilled in vacuo) was dissolved in a mixture of dimethylformamide (100 ml.), water (100 ml.) and triethylamine (2.5 ml.). Cellulose carbonate (500 mg.) was added slowly to the stirred solution. The mixture was stirred overnight at room temperature and then filtered. The residue was washed with dimethylformamide (100 ml.), 0.25 acetate buffer, pH 5.0 (100 ml.) and water (200 ml.), and then it was dried in vacuo over $P_2O_5$.

A sample of this material (100 mg.) was stirred at 0° C. in N hydrochloric acid solution (5.0 ml.), sodium nitrite solution (2%, 5.0 ml.) was added slowly and the mixture stirred at 0° C. for 15 minutes. The solid was then recovered by centrifugation and washed three times by stirring for 15 minutes with 0.1 M phosphate buffer pH 7.8 (10 ml.).

Coupling of $\beta$-glucosidase.—The solid prepared as above was stirred with $\beta$-glucosidase solution (5 mg. in 0.1 M phosphate buffer, pH 7.8; 20 ml.) at 5° C. for 18 hours. An ice-cold saturated solution of $\beta$-naphthol in saturated sodium acetate solution (5 ml.) was added and the mixture stirred for 15 minutes. The solid was then recovered by centrifugation and washed twice as described above. A control preparation was prepared in exactly the same way using cellulose in place of the diazotized diaminobenzene derivative of cellulose carbonate. Both were made up to 5 ml. with 0.05 M acetate buffer pH 5.0.

Assay of $\beta$-glucosidase activity.—This was carried out in the normal manner. The test preparation liberated 1.06 $\mu$mole of O-nitrophenol in 15 minutes at 37° C. while the control liberated 0.05 $\mu$mole.

EXAMPLE XXVIII

Coupling of glucoamylase with diazotized diaminobenzene derivative of cellulose carbonate The diazotized diaminobenzene derivative (100 mg.) was prepared as described in Example XXVII. Glucoamylase solution (1.0 ml.) was coupled to this derivative as described in Example XXVII. The same washing procedure was carried out and the solid product was finally suspended in 0.2 M acetate buffer pH 4.0 (5 ml.). A control experiment was carried out in which cellulose replaced the diazotized derivative.

The enzymic activities of the test and control preparations were assayed as described in Example XXVI. The solid phase enzyme liberated 69 $\mu$g. of glucose per ml. in 1 hr. while the control liberated 23 $\mu$g.

What is claimed is:
1. A process for the preparation of a water insoluble enzyme preparation which process comprises reacting an enzyme selected from the group consisting of $\beta$-N-acetylglucosaminidase, $\beta$-glucosidase, trypsin, $\alpha$-amylase, glucoamylase, $\beta$-galactosidase, $\alpha$-mannosidase and $\alpha$-glucosidase dissolved or suspended in an aqueous solution with a cellulose carbonate comprising trans-cyclic carbonate groupings bridging $C_2$ and $C_3$ of some or all of its 1,4-$\beta$D-glucopyranose units.

2. A process as claimed in claim 1, wherein the enzyme is mouse kidney β-N-acetylglucosaminidase, mouse liver β-galactosidase, mouse liver α-mannosidase, mouse liver α-glucosidase or mouse liver β-N-acetylglucosaminidase.

3. A process as claimed in claim 1, wherein the aqueous solution is in the pH range of 2.7 to 11.8.

4. A process as claimed in claim 3, wherein the pH range is from 6.5 to 8.5.

5. A process as claimed in claim 3, wherein the temperature is between 0° C. and 50° C. and the reaction time between 2 minutes and 3 hours.

6. Active water insoluble enzyme preparations wherein an enzyme selected from the group consisting of β-N-acetylucosaminidase, β-glucosidase, trypsin, α-amylase, glucoamylase, β-galactosidase, α-mannosidase and α-glucosidase is chemically coupled to a cellulose carbonate comprising trans-cyclic carbonate groups bridging $C_2$ and $C_3$ of some or all of its 1,4-βD-glucopyranose units.

7. Water insoluble mouse kidney β-N-acetylglucosaminidase chemically coupled to a cellulose carbonate comprising trans-cyclic carbonate groupings bridging $C_2$ and $C_3$ of some or all of its 1,4-βD-glucopyranose units.

8. Water insoluble mouse liver β-galactosidase, mouse liver α-mannosidase, mouse liver α-glucosidase or mouse liver β-N-acetylglucosaminidase chemically coupled to a cellulose carbonate comprising trans-cyclic carbonate groupings bridging $C_2$ and $C_3$ of some or all of its 1,4-βD-glucopyranose units.

9. Water insoluble β-glucosidase chemically coupled to a cellulose carbonate comprising trans-cyclic carbonate groupings bridging $C_2$ and $C_3$ of some or all of its 1,4-βD-glucopyranose units.

10. Water insoluble trypsin chemically coupled to a cellulose carbonate comprising trans-cyclic carbonate groupings bridging $C_2$ and $C_3$ of some or all of its 1,4-βD-glucopyranose units.

11. Water insoluble α-amylase chemically coupled to a cellulose carbonate comprising trans-cyclic carbonate groupings bridging $C_2$ and $C_3$ of some or all of its 1,4-βD-glucopyranose units.

12. Water insoluble glucoamylase chemically coupled to a cellulose carbonate comprising trans-cyclic carbonate groupings bridging $C_2$ and $C_3$ of some or all of its 1,4-βD-glucopyranose units.

References Cited

UNITED STATES PATENTS

| | | | |
|---|---|---|---|
| 3,419,543 | 12/1968 | Mold et al. | 260—228 X |
| 3,616,229 | 10/1971 | Wildi et al. | 195—68 |
| 3,627,638 | 12/1971 | Barker et al. | 195—63 |
| 3,167,485 | 1/1965 | Katchalski et al. | 195—63 |

OTHER REFERENCES

Weliky, et al., The Chemistry and Use of Cellulose Derivatives for the Study of Biological Systems, Immunochemistry, December 1965, vol. 2 (pp. 302–312).

Noller, C. R., Chemistry of Organic Compounds, W. B. Saunders Co., Philadelphia, 1951 (pp. 238–240).

DAVID M. NAFF, Primary Examiner

U.S. Cl. X.R.

195—68, Dig. 11